No. 741,351. PATENTED OCT. 13, 1903.
G. LOEB, Jr.
WASHTUB.
APPLICATION FILED FEB. 16, 1903.
NO MODEL.
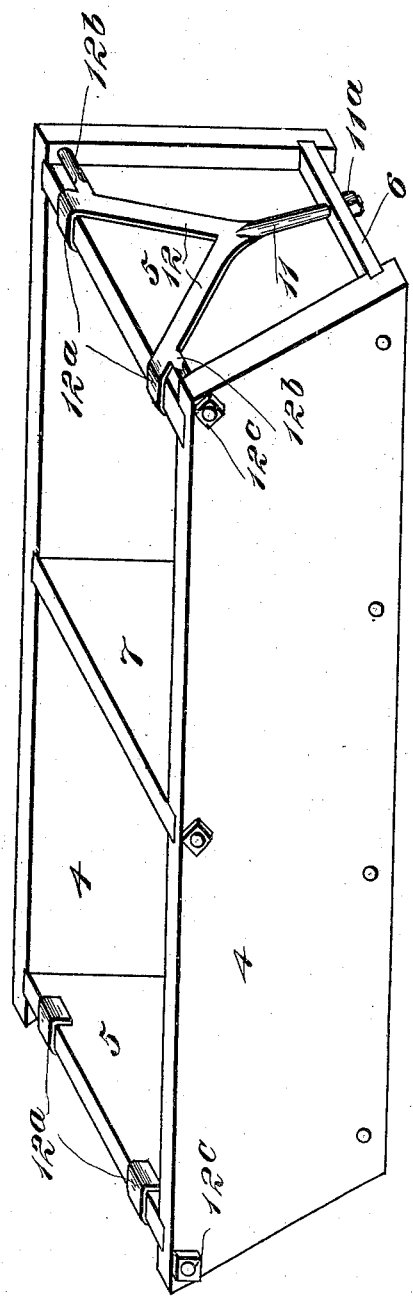
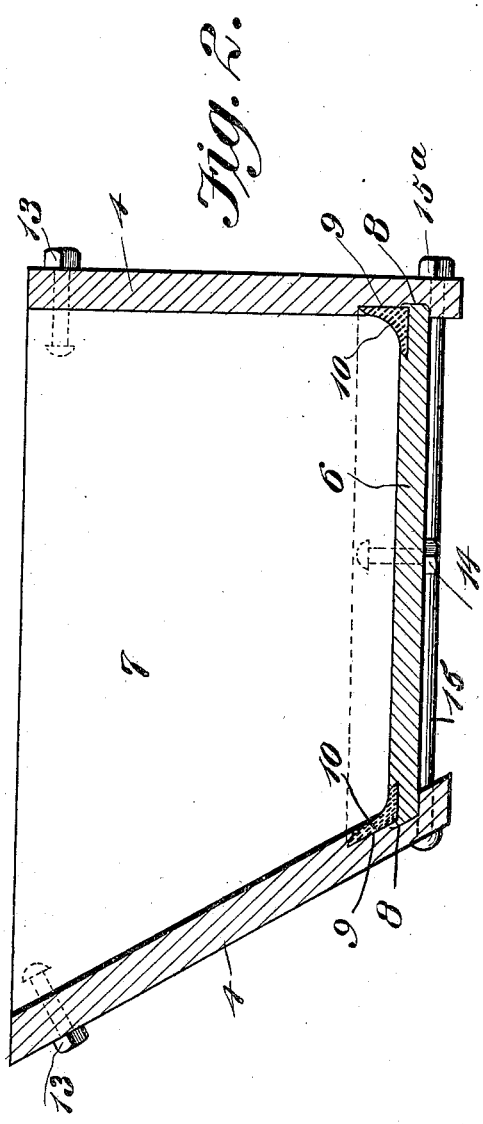
WITNESSES:
O. E. Murray
M. A. Schmidt
INVENTOR
George Loeb, Jr.
BY
Wils B. Stevens & Co
ATTORNEYS.

No. 741,351. Patented October 13, 1903.

UNITED STATES PATENT OFFICE.

GEORGE LOEB, JR., OF LAKEWOOD, OHIO.

WASHTUB.

SPECIFICATION forming part of Letters Patent No. 741,351, dated October 13, 1903.

Application filed February 16, 1903. Serial No. 143,494. (No model.)

*To all whom it may concern:*

Be it known that I, GEORGE LOEB, Jr., a citizen of the United States, residing at Lakewood, in the county of Cuyahoga and State of Ohio, have invented certain new and useful Improvements in Washtubs; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to washtubs, particularly that kind made of slabs of slate or other stone, and has for its object an improved construction for joining and holding together said slabs.

Improved details in the construction and arrangement of the several parts of my invention will be apparent from the detailed description hereinafter and the appended claims, when taken in connection with the accompanying drawings, forming part hereof.

In the drawings, Figure 1 is a perspective view of my improved washtub. Fig. 2 is a cross-section thereof.

Referring specifically to the drawings, 4 indicates the sides, 5 the ends, and 6 the bottom of the tub. It also has the usual partition or division-wall 7. These parts are secured together in the manner to be hereinafter described. The bottom is set into a groove 8, formed in the sides. I also form an undercut rabbet 9 adjacent the grooves on the sides, ends, and bottom where these parts join. This rabbet is filled with cement or other similar and suitable material, as indicated at 10. The purpose of this is to round all the inside corners and to make the joints watertight. The cement filling at one end of the tub is shown in dotted lines in Fig. 2. The ends, sides, and bottom are held and clamped together by a Y-shaped clamping device at each end, comprising a stem 11, extending through the bottom and threaded to receive a nut $11^a$. Two branches 12 extend laterally from the stem and have at their ends hooks $12^a$, engaging the upper edge of the end piece 5. Just below each hook a short stem $12^b$ extends through the adjacent side piece 4. Each of these stems is also threaded for a nut $12^c$. As will be seen, the bottom, sides, and ends are drawn and clamped together by tightening the nut $11^a$, the draw of the nut being a consequent of the Y-shaped device, both vertically on the end and bottom and laterally and inwardly on the sides. This produces a simple and effective securing device which assists to bind all parts together by the action of the nuts $11^a$. The partition 7 is secured to the sides by bolts 13 and to the bottom by a bolt 14. These bolts are embedded in the material forming the partition and extend through the sides and bottom, respectively, their outer ends being threaded for a nut. To assist in holding the sides and bottom together, I employ binding-rods 15, threaded at one end to receive nuts $15^a$. These binding-rods pass through the sides and are so located that the bottom rests thereupon.

Having thus described my invention, what is claimed as new, and desired to be secured by Letters Patent, is—

1. The combination with the sides, end and bottom of a washtub, of a Y-shaped clamping device the stem of which is threaded and extends through the bottom of the tub and has a binding-nut thereon, and each branch of which is forked at the outer end and formed into a hook extending over the end of the tub and a threaded bolt extending through the side of the tub, substantially as described.

2. A washtub comprising a bottom, ends and sides joined together and having undercut rabbets at their joints, and a filling of plastic material in said rabbets, over the joints, substantially as described.

In testimony whereof I do affix my signature in presence of two witnesses.

GEORGE LOEB, JR.

Witnesses:
JOHN A. BOMMHARDT,
LOTTIE NEWBURN.